Figure 1:
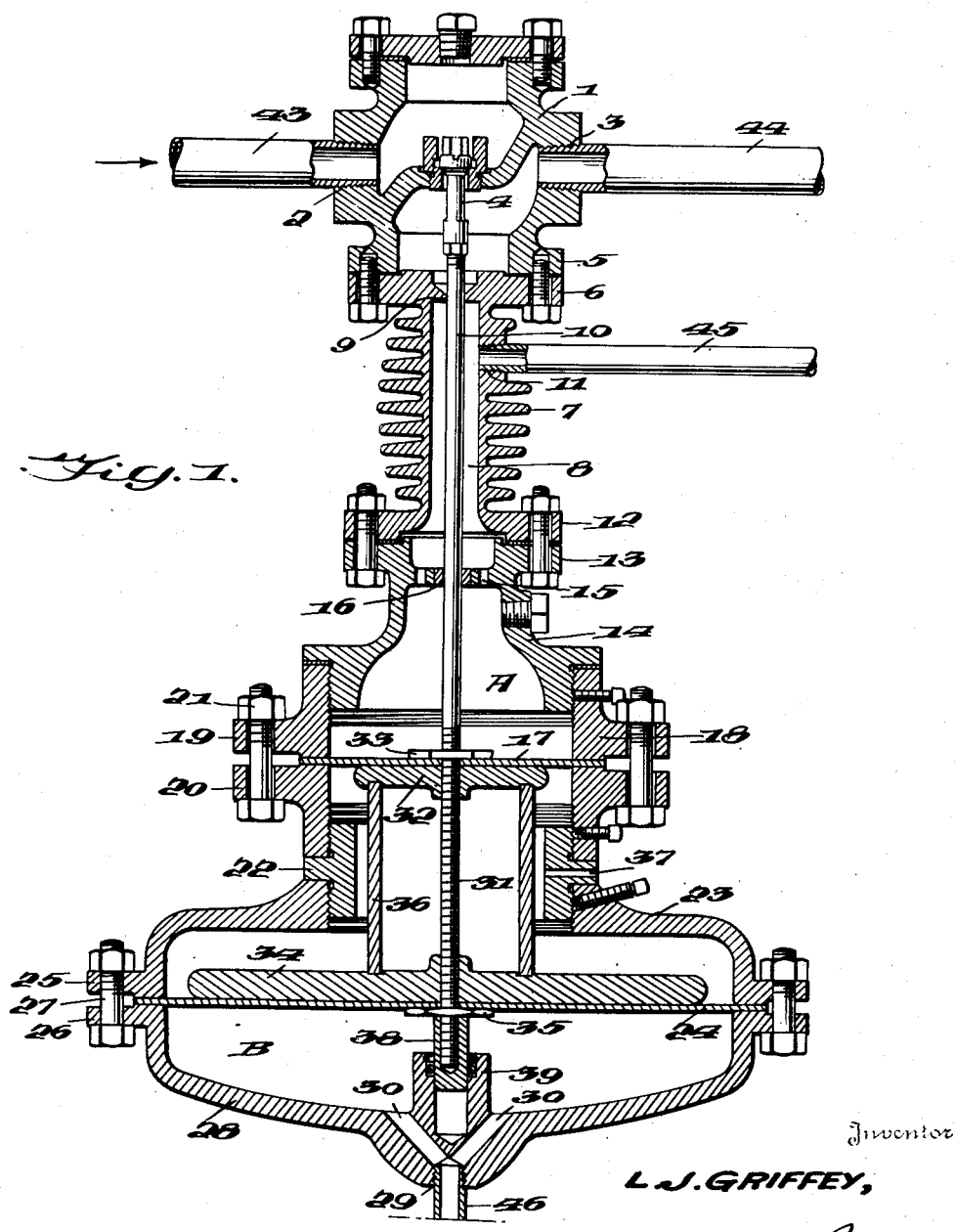

Dec. 9, 1941.   L. J. GRIFFEY   2,265,599
PRESSURE REGULATOR
Filed Aug. 10, 1939   2 Sheets-Sheet 1

Inventor
L. J. GRIFFEY,
By Prindle & Prindle
Attorneys

Dec. 9, 1941.    L. J. GRIFFEY    2,265,599
PRESSURE REGULATOR
Filed Aug. 10, 1939    2 Sheets-Sheet 2

Inventor
L. J. GRIFFEY,
By Prevost & Prevost
Attorneys

Patented Dec. 9, 1941

2,265,599

UNITED STATES PATENT OFFICE 2,265,599

PRESSURE REGULATOR

Leon J. Griffey, Tulsa, Okla., assignor to Hanlon-Waters, Inc., Tulsa, Okla.

Application August 10, 1939, Serial No. 289,484

3 Claims. (Cl. 236—92)

My invention consists in new and useful improvements in a duplex diaphragm regulator which may be used in connection with various heating processes for controlling the flow of a heating medium where the latter condenses during the heat transfer process and is primarily designed for use in conjunction with temperature controllers for regulating the flow of steam to heaters for gasoline or other fluids in refineries, gasoline plants, or other industries.

It is the object of my invention to provide a regulator which will afford a closer and more definite control of the flow of the heating medium such as steam, to that part of the apparatus which is to be heated.

Another object of my invention is to provide a regulator which eliminates the necessity of weights, springs and the like, and employs a duplex diaphragm assembly so connected to the inner valve of the regulator that the valve has no definite position for a set pressure in the diaphragm operating area. In other words, it is my object to provide a structure wherein the inner valve assembly including the diaphragm unit is free-floating throughout its range of travel and can assume any position necessary to pass the correct quantity of steam or other heating medium to maintain the pressure balance developed by the areas of the diaphragms, times their respective pressures.

Heretofore, where a conventional motor valve has been used in the steam line to a heating element without this pressure compensation, the action of the temperature control has had to be slowed down to a point where the temperature deviation would give a very small change of inner valve movement. With the instrument in high sensitivity, the motor valve has had a tendency to over-shoot and permit the steam flow to change in excess of that required for maintaining a constant temperature.

On the other hand, with my improved duplex diaphragm controller I can operate the temperature instruments in greater sensitivity of setting, as the pressure compensation will not permit the regulator to move from one extreme of travel to the other. The pressure of the steam reboiler or other part of the apparatus to be heated can vary only in fixed ratio to the pressure transmitted from the instrument. Thus the pressure compensation is immediate and without lag, thereby affording more accurate temperature control.

Furthermore, on ordinary temperature controllers, the instrument must be readjusted frequently unless complicated mechanisms are used either on the valve in the form of a valve positioner, or in the instrument to compensate for changes of steam flow required for changes of capacity. It is therefore another object of my invention to overcome this disadvantage and to provide a structure wherein no adjustments are necessary, due to the fact that the inner valve will assume a position necessary to maintain a constant pressure of the steam in the heating element without regard to the rate of steam-flow.

With the above and other objects in view which will appear as the description proceeds, my invention consists in the novel features herein set forth, illustrated in the accompanying drawings and more particularly pointed out in the appended claims.

Figure 2:
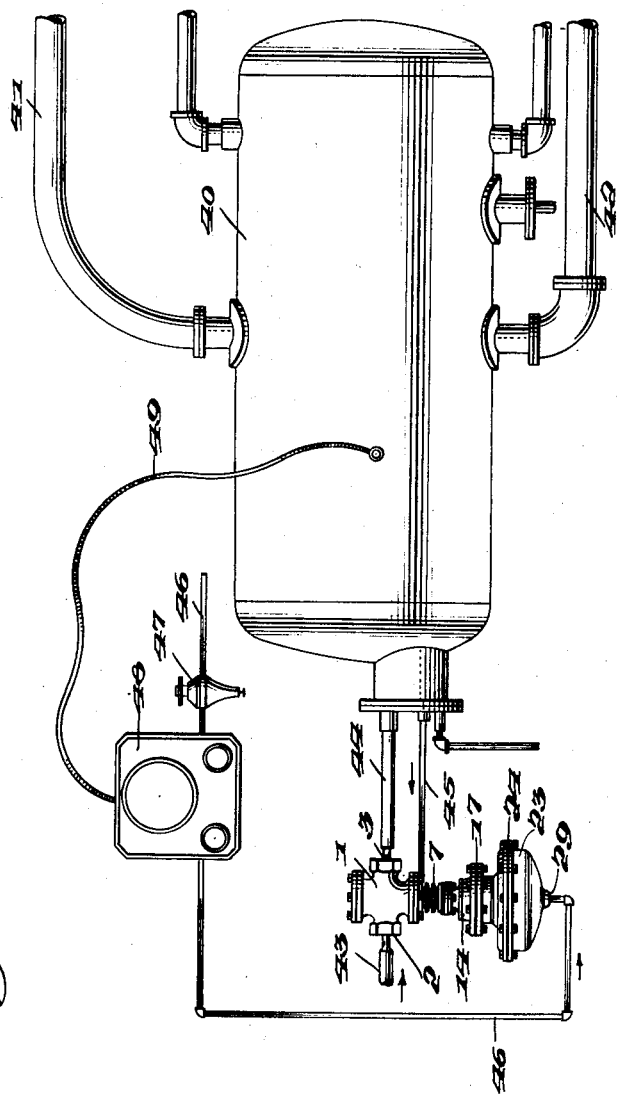

Referring to the drawings in which numerals of like character designate similar parts throughout both views, Fig. 1 is a vertical sectional view of my improved duplex diaphragm regulator, and Fig. 2 is a fragmentary elevation showing one form of installation with which my invention may be advantageously employed.

In the drawings, referring to Fig. 1, numeral 1 represents the valve body of my improved regulator which may be of any convenient construction, having an inlet opening 2 and a discharge opening 3, a suitable inner valve 4 controlling the flow of fluid through the valve body.

The valve body may be screwed, flanged or union-ended with either single or double port construction, depending upon the type of installation in which it is to be used. In the drawings I have shown a single ported valve and the valve body is flanged as at 5 for connection to a complementary flange 6 of a finned cooling section 7. The cooling section 7 is provided with a central, longitudinal passageway 8 terminating at its upper extremity in a restricted opening 9 which serves as a guide for the extended valve stem 10 connected by any suitable means to the inner valve 4. A controlling pressure opening 11 extends through the wall of the cooling section 7 to the passageway 8 for the purpose hereinafter set forth.

At the lower end of the cooling section 7, I provide a second flange 12 which cooperates with the complementary flange 13 of a diaphragm housing 14 for coaxially joining these elements. The top of the diaphragm housing 14 forms a pressure chamber A which is in communication with the passageway 8 of the cooling section through ports 15, and a guide opening 16 accommodates the extended valve stem 10.

An upper diaphragm 17 forms the bottom of chamber A and is secured in place by a diaphragm adapter 18, the upper surface of said diaphragm being responsive to the pressure conditions in the diaphragm housing 14 and passageway 8 of the cooling section 7. As shown in the drawings, the adapter 18 consists of two oppositely disposed flanged members 19 and 20 between which the edges of the diaphragm are secured by bolts 21, said adapter being threaded internally to engage complementary threads on the housing 14. It will be understood, however, that I do not intend to limit myself to this specific construction, as various diaphragm adapters and means of connection may be employed with equal effect.

The lower section 20 of the diaphragm adapter 18 is threaded to engage a connecting member 22 for coaxially joining the housing 23 of a lower diaphragm 24. It will be noted that the area of the lower diaphragm 24 is somewhat larger than that of the upper diaphragm 17, this difference in area being predetermined depending upon the conditions prevailing in the installation with which the unit is to be employed, as will later appear.

As in the case of the diaphragm 17, the edges of the diaphragm 24 are secured between opposed flanges 25 and 26 fastened together by bolts 27. The lower half 28 of the housing 23 forms a diaphragm operating chamber B and is provided with a controlled pressure opening 29 arranged in communication with passageways 30 leading to said diaphragm operating chamber B.

The lower end of the valve stem 10 is threaded as at 31 and extends through both diaphragms. A diaphragm plate 32 on the underside of the diaphragm 17 is threaded to engage the stem 31 and a lock nut 33 engages the stem on the upper side of said diaphragm whereby the latter is positively locked to the stem. Similarly, a diaphragm plate 34 on the upper side of the lower diaphragm 24 is threaded to engage the stem threads 31, said diaphragm 24 being locked to the stem by a lock nut 35 on its underside. A cylindrical diaphragm spacer 36 fitting in suitable annular grooves in the opposed diaphragm plates 32 and 34 maintains the two diaphragms in predetermined spaced relation, the opposite inner surfaces of said diaphragms being maintained at atmospheric pressure through the medium of a port 37 extending through the connecting member 22 from the annular space between said member and the spacer 36 to the atmosphere.

Preferably, in order to maintain the valve stem 10 in accurate vertical alignment during its movement by the diaphragms, the lower threaded end of said stem is screwed into a head 38 slidably disposed in a guide well 39 formed integral with the lower portion 28 of the diaphragm housing 23.

As heretofore stated, my improved duplex diaphragm regulator may be used in various installations but for the purpose of illustration I have shown the device in Fig. 2 installed in the steam line leading to a stabilizer reboiler which may be piped directly to the fractionating column of a conventional oil refining system.

Referring to Fig. 2, 40 represents a reboiler connected by pipes 41 and 42 to a fractionating column (not shown) in such a manner that the liquid can gravitate from the bottom of the fractionating column through line 42 into the bottom of the reboiler 40, the vapors from the reboiler returning to the fractionating column through line 41. A live steam line 43 from any suitable source is connected to the inlet port 2 of the valve body 1, the discharge port 3 of said valve body being connected by line 44 into one end of the reboiler 40. A control pressure line 45 is connected into the port 11 of the finned cooling section 7 and leads into the heater of reboiler 40, whereby the steam pressure conditions in the heater are transmitted to the diaphragm chamber A adjacent the upper surface of diaphragm 17, as will later appear.

An instrument control pressure line 46 having therein a pressure reducing valve 47 leads to the opening 29 in the bottom 28 of the lower diaphragm housing 23, a suitable temperature controller 48 of any conventional design being interposed in said line 46 to control the passage of compressed air or other pressure fluid into the lower diaphragm chamber B, this temperature controlling instrument 48 being responsive to temperature conditions in the reboiler through any suitable transmitting means 49.

It will be noted that this unit must be installed in the steam line to the reboiler or other heating element with the diaphragm assembly below the valve body 1 for the reason that it is important to maintain a condensate seal on the diaphragm 17. The heating medium need not always be steam but may be any condensible medium relieving its latent heat upon condensation, the function of the radiant finned section 7 being to condense the vapors entering through line 45 from the reboiler and to dissipate the maximum amount of heat from the condensate seal on the diaphragm 17. Since condensate requires greater area for free flow than does a gaseous medium, I have found it advisable to provide openings 15 in the diaphragm bridge 16 to permit a greater freedom of inlet and outlet flow of the steam condensate in the smaller diaphragm area or chamber A above diaphragm 17 for a change of diaphragm position.

Having thus described the construction of my improved duplex diaphragm regulator and its installation in one form of apparatus, its operation is as follows:

The temperature control instrument 48, as before stated, is responsive to the temperature conditions in the reboiler 41 through the transmitting means 49. This instrument 48 is set in the usual manner to operate at a predetermined temperature to control the flow of compressed air or other medium through line 46 to the chamber B on the underside of large diaphragm 24. The chamber A on the upper side of the smaller diaphragm 17 is responsive to the pressure conditions in said reboiler through line 45. Thus the duplex diaphragm and valve assembly, consisting of the two diaphragms 17 and 24, diaphragm plates 32 and 34, spacer 36, valve stem 10 and inner valve 4, is free-floating throughout its range of travel, between the two pressure sources in communication with the operating faces of the respective diaphragms.

It will be seen that I employ no weights or springs in the construction of this unit and the diaphragm-valve assembly has no definite position for a set pressure in diaphragm chamber B. Thus the inner valve 4 can assume any position necessary to pass the correct quantity of steam to maintain the pressure balance developed by the areas of the diaphragms times their respective pressures.

Reference to any standard steam table shows that on an increase of pressure on steam, there is a corresponding increase in temperature, and on a reduction in steam pressure, there is a resulting reduction in steam temperature. Consequently, if the inner valve 4 opens from a closed position, the temperature in the reboiler 40 will be increased as a result of the increase in the down-stream steam pressure admitted through lines 43—44. If the valve 4 throttles to a closed position, the temperature of the steam in the reboiler will be reduced by reduction of steam pressure therein. Thus, in the present installation, the changing pressure conditions in the reboiler 40 are transmitted through line 45 to the upper diaphragm chamber A above diaphragm 17.

The instrument control pressure is transmitted through line 46 to the lower chamber B of diaphragm 24 and this pressure can never be greater than the maximum controlled pressure transmitted by the instrument 48 which in most cases is fifteen pounds. Consequently, the ratio of the areas A and B above diaphragm 17 and below diaphragm 24, respectively, must be in such proportion to one another than the fifteen-pound pressure on the larger diaphragm 24 will have sufficient effective loading force on diaphragm 17 through spacer 36 that the required control pressure in the reboiler 40 as transmitted to the diaphragm 17 through line 45, will maintain the desired temperature in the reboiler.

The steam pressure from the reboiler through line 45 comes in direct contact with the upper surface of diaphragm 17 and the transmitted instrument pressure through line 46 comes in direct contact with the larger diaphragm 24. As heretofore pointed out, the opposed inner faces of these diaphragms are at atmospheric pressure through the medium of port 37. The temperature controller 48 sets a steam pressure to be controlled in the reboiler rather than setting an orifice size for the flow of steam to the reboiler without regard to the pressure on the down-stream side of the regulator. Thus, with my improved device, I have a temperature controlled regulator for handling steam or other condensible heating medium to the reboiler which is pressure compensated. In other words, I am actuating a pressure control valve 4 in such a manner from a temperature controlled instrument that, rather than setting a flow of steam to the heating element or reboiler, I set a control pressure for the steam in the reboiler.

The pressure compensation in the unit permits closer control of the temperatures in the reboiler than can be obtained with a conventional temperature controller actuating a direct operated motor valve, as the temperature in the heating element does not have to change before the motor valve can be adjusted to a new position of opening.

It will be apparent that with the use of my improved duplex diaphragm regulator, the function of the temperature control instrument in a system such as above described is minimized and consequently a much less expensive instrument may be used, as the instrument functions only to take care of changes of specific heat of the processed liquid and the changes of heat transfer for different rates of capacity.

In fact, temperature control with this unit could be approximated by maintaining a constant pressure in chamber B upon the diaphragm 24 in a satisfactory manner, for conditions of constant flow and constant constituency of the liquid. The only function of the temperature control is to reset the down-stream control pressure through line 46, for variable conditions within the reboiler 40 or other heating unit in a process.

Therefore, I do not intend to limit myself with respect to the use of my improved regulator with any particular type of controller as the latter may be any device for throttling the flow of an auxiliary operating medium to the chamber B of diaphragm 24, in such a manner than changes in transmitted pressure will be reflected by changes in temperature of the liquid being operated upon.

From the foregoing it is believed that my invention may be readily understood by those skilled in the art without further description, it being borne in mind that numerous changes may be made in the details of construction and application without departing from the spirit of the invention as set forth in the following claims.

What I claim and desire to secure by Letters Patent is:

1. In a system for maintaining a constant temperature in a liquid heating vessel having a heating element therein, by controlling the admission of a condensible heating fluid to said heating element; a temperature-pressure controlled regulator assembly comprising a main valve unit having an inner valve for controlling the flow of said heating fluid to said heating element, a diaphragm unit arranged coaxially with said valve unit, a free-floating diaphragm assembly in said last named unit dividing the same into two opposed pressure chambers, a coaxial condenser unit interposed between said first named units in communication with one of said chambers and forming a connecting means for said units, a valve stem secured at one end to said inner valve and extending axially through said condenser unit, its opposite end terminating within said diaphragm unit and being fixed to said diaphragm assembly, means including said condenser unit for placing the respective pressure chamber in communication with said heating element whereby one side of said diaphragm assembly is influenced by the pressure of the heating fluid in said heating element, a separate source of loading pressure connected to the other chamber, and means under control of the temperature of the liquid being treated in said vessel for regulating the admission of said loading pressure to influence the other side of said diaphragm assembly.

2. In a system for maintaining a constant temperature in a liquid heating vessel by controlling the pressure of a heating fluid admitted thereto, a temperature-pressure control regulator assembly comprising a diaphragm casing divided by an upper relatively small diaphragm and a lower relatively large diaphragm into upper and lower pressure chambers, means for transmitting the pressure of the heating fluid in said vessel to the upper one of said chambers, a source of loading pressure extraneous of the vessel, connected to the lower one of said chambers, said diaphragm unit being arranged to float freely between said chambers and being responsive to variations in the differential pressures transmitted to said chambers, a valve chamber arranged above said diaphragm unit, a valve in said valve chamber connected to said diaphragm unit and movable in unison therewith to directly regulate the flow of heating fluid to said vessel, whereby said valve may assume any position necessary to pass the correct quantity of heating fluid for maintaining the pressure balance developed on opposite sides of said diaphragm unit, means to prevent communication between said upper chamber and the valve chamber, and means responsive to temperature changes in said vessel for controlling said loading pressure.

3. A system as claimed in claim 2, wherein said diaphragm unit comprises means interposed between said diaphragms for maintaining a fixed spaced relation to cause the diaphragms to move as a unit, said last mentioned means including an upper plate of substantially the same area as the upper diaphragm and engaging the latter, a lower plate of substantially the same area as the lower diaphragm and engaging the latter, and a spacing element between and engaging said plates.

LEON J. GRIFFEY.